United States Patent [19]
Saito et al.

[11] Patent Number: 4,721,861
[45] Date of Patent: Jan. 26, 1988

[54] TURBINE HELPER DRIVE APPARATUS

[75] Inventors: Suzuo Saito; Teruo Nakagawa; Akio Hirata; Tadao Mose; Kohsaku Ichikawa; Kazuto Kawakami, all of Tokyo; Tsugunori Kuga, Yokohama, all of Japan

[73] Assignee: Kabushiki Kaisha Toshiba, Kawasaki, Japan

[21] Appl. No.: 943,766

[22] Filed: Dec. 19, 1986

[30] Foreign Application Priority Data

Dec. 24, 1985 [JP] Japan ................... 60-289144
May 27, 1986 [JP] Japan ................... 61-120126
Jun. 2, 1986 [JP] Japan ................... 61-125638

[51] Int. Cl.$^4$ ........................................... F16H 37/08
[52] U.S. Cl. ................................. 290/4 R; 290/4 C
[58] Field of Search .................... 290/4 R, 4 C; 318/8

[56] References Cited

U.S. PATENT DOCUMENTS

| 3,543,518 | 12/1970 | Shibata | 290/4 R |
| 3,732,751 | 5/1973 | Berman et al. | 290/4 C X |
| 4,246,528 | 1/1981 | Nakajima | 318/721 |
| 4,394,582 | 7/1983 | Kreissl et al. | 290/4 C |
| 4,446,376 | 5/1984 | Baker | 290/4 R X |
| 4,572,961 | 2/1986 | Borger | 290/4 R |

FOREIGN PATENT DOCUMENTS 0144161 6/1985 European Pat. Off. .

OTHER PUBLICATIONS

"Patent Abstracts of Japan", vol. 9, No. 39, (E-297), [1762], 19th Feb. 1985; & JP-A-59 178 990, (Nippon Kokan K.K.), 11-10-1984.

"Patent Abstracts of Japan", vol. 8, No. 21, (E-224), [1458], 28th Jan. 1984; & JP-A-58 182 488, (Toyo Denki Seizo K.K.), 25-10-1983.

Primary Examiner—William M. Shoop, Jr.
Assistant Examiner—W. E. Duncanson, Jr.
Attorney, Agent, or Firm—Oblon, Fisher, Spivak, McClelland & Maier

[57] ABSTRACT

A turbine helper drive apparatus has an induction motor coupled to a turbine, and a power converter for power-controlling the motor. Part of the load of the turbine is shared by the motor in accordance with preset power for power control, so that auxiliary drive to compensate for the insufficient capacity of the turbine is performed and cheaper, late-night electric power is effectively utilized.

15 Claims, 16 Drawing Figures

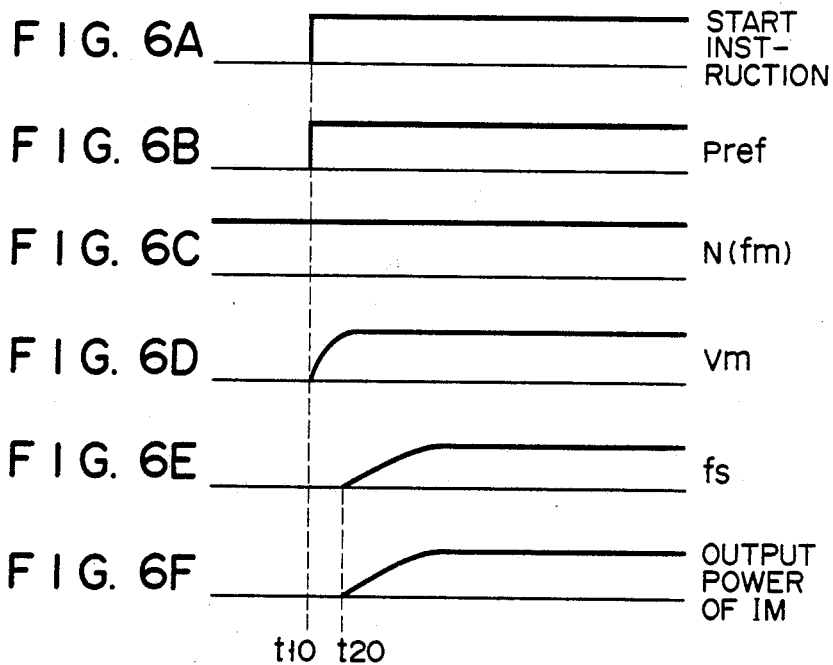
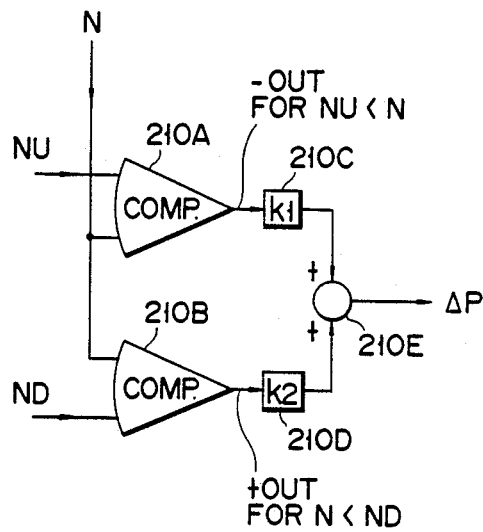

TURBINE HELPER DRIVE APPARATUS

BACKGROUND OF THE INVENTION

The present invention relates to a turbine helper drive apparatus wherein an AC motor is coupled to a turbine, and a torque generated by the AC motor is added to a torque generated by the turbine, thereby driving a load.

A large compressor, for example, is often driven at a constant speed by a steam turbine. When the capacity of the compressor is increased, the turbine and its associated facilities must be exchanged.

Recently, since the rate of electric power is cheaper after midnight, it is more economical, in the nighttime, for operation to use a motor than a steam turbine.

Therefore, a demand has arisen to couple a motor to the turbine so as to use it as a helper. However, an appropriate drive method for this has not yet been provided.

SUMMARY OF THE INVENTION

It is an object of the present invention to provide a turbine helper drive apparatus wherein an AC motor, advantageous for high-speed operation, is coupled to a turbine, and the output of the AC motor is controlled to a required value through a power converter, thereby assisting driving of a turbine load.

To achieve the above object, a turbine helper drive apparatus according to the present invention has an AC motor (e.g., an induction motor or a synchronous motor) coupled to a turbine, and a power converter (using e.g., a self-commutated inverter, or a load-commutated inverter) for performing power control of the AC motor. The turbine load is partially assigned to, or shared by, the AC motor in accordance with preset power for power control, thereby performing auxiliary drive to compensate for the insufficient capacity of the turbine and effectively utilizing the less expensive power available for nighttime.

BRIEF DESCRIPTION OF THE DRAWINGS

FIGS. 6A to 6F are timing charts for explaining the circuit operation of FIG. 5;

FIG. 11 is a circuit diagram showing a practical example of comparator circuit 210 shown in FIG. 10.

DETAILED DESCRIPTION OF THE PREFERRED EMBODIMENTS

Figure 1:
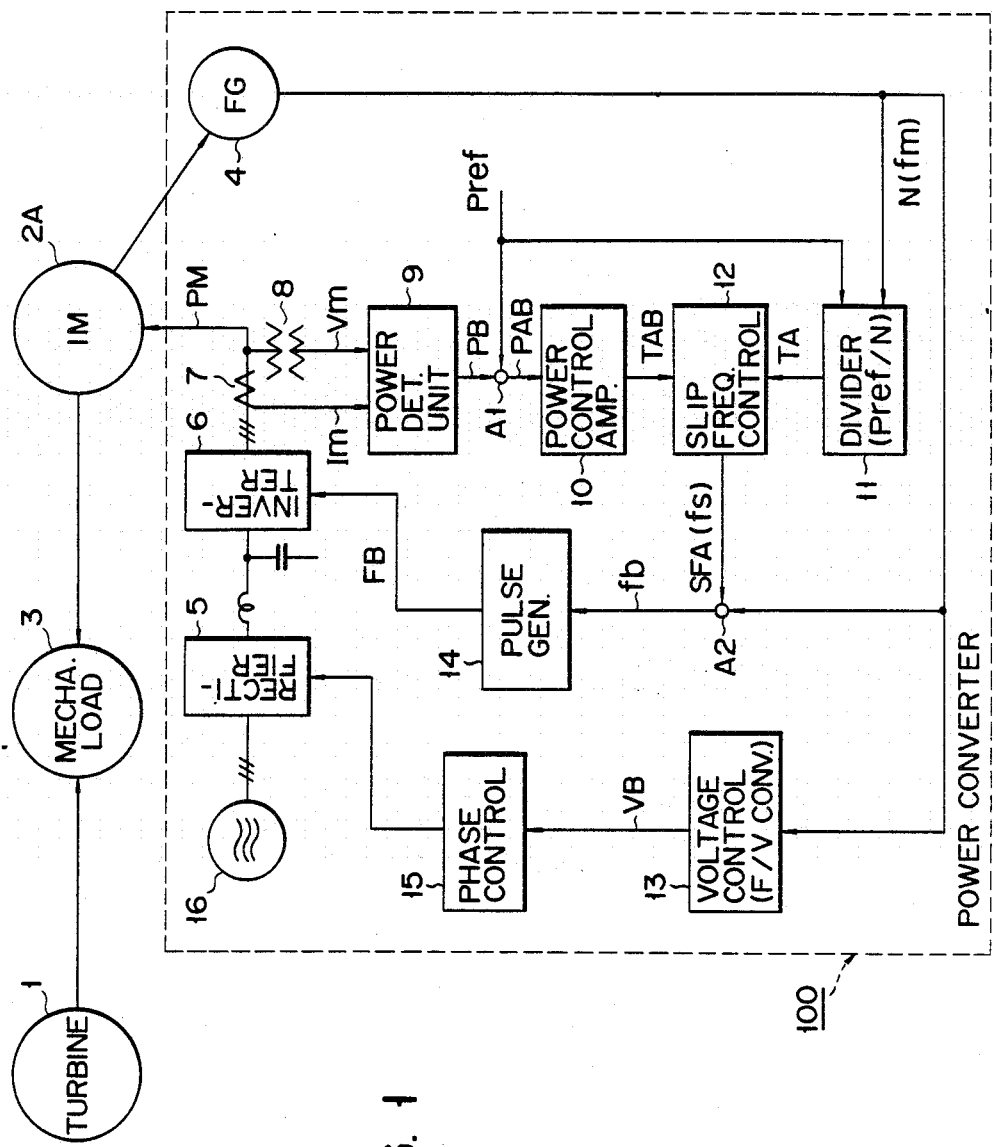
FIG. 1 is a block diagram of a turbine helper drive apparatus according to an embodiment of the present invention, in which an induction motor (2A) is driven under the control of a constant V/F ratio and its slip frequency (fs) is controlled.

In the following description, the same reference numerals denote the same or common portions throughout the drawings and a repeated explanation is minimized.

FIG. 1 shows a first embodiment of the present invention.

Referring to FIG. 1, steam turbine 1, induction motor 2A, and mechanical load (e.g., a compressor) 3 are provided. Motor 2A is coupled to the same axle of a mechanical load and serves as a helper motor of turbine 1.

The portion surrounded by a broken line is power converter 100. Converter 100 controls input power PM of motor 2A to preset power reference Pref. Converter 100 has frequency generator 4, rectifier 5, inverter 6, current transformer 7, potential transformer 8, power detector unit 9, power control amplifier 10, divider 11 for generating a torque reference, slip frequency controller 12, F/V converter (voltage controller) 13, pulse generator 14, and phase controller 15. Note that slip frequency reference SFA is employed, as a torque reference, in the embodiment of FIG. 1.

An output from 3-phase AC power source 16 is converted into a variable AC voltage (Vm) with a variable frequency, via rectifier 5 and inverter 6, and the converted voltage (Vm) is supplied to motor 2A. Motor 2A is coupled to the same axle of turbine 1 so as to share part of the drive power for mechanical load 3.

The rotational frequency of turbine 1 is maintained constant by a governor (not shown). Load sharing of turbine 1 and motor 2A is determined by controlling input power PM of motor 2A at a required value. Input power PM of motor 2A is controlled at the required value by performing power control of power converter 100 in accordance with power reference Pref.

Signals Im and Vm from transformers 7 and 8, respectively, are supplied to power detector unit 9. Detector unit 9 outputs power feedback signal PB, which represents an active component of power PM, in accordance with signals Im and Vm. Output signal PB is subjected to subtraction with reference Pref by adder A1, and difference $PAB(=PB-Pref)$ therebetween is converted into torque correction signal TAB, through amplifier 10. Signal TAB is then input to frequency controller 12. Detector unit 9 performs the arithmetic operation of $PB=\sqrt{3}Vm \cdot Im \cdot \cos\phi m$ (where $\phi m$ is a phase difference between Vm and Im, i.e., $\cos\phi m$ is the power factor), and amplifier 10 performs arithmetic operation of $TAB=-\int PAB \cdot dt$.

Meanwhile, power reference Pref is input to divider 11 as a dividend. Divider 11 also receives frequency signal N (frequency fm) of motor 2A which is output from frequency generator 4. Reference Pref is divided by signal N by divider 11. Divider 11 generates torque instruction signal TA corresponding to reference Pref normalized by signal N. Signal TA is then input to controller 12.

Slip frequency controller 12 calculates reference SFA of slip frequency fs based on signals TAB and TA (SFA=TA+TAB). Calculated reference SFA is passed through a limiter (not shown), and is added, by adder A2, with frequency fm which corresponds to frequency signal N detected by generator 4. Then, frequency fb(=fm+SFA) is obtained. Frequency fb is supplied to pulse generator 14 to determine frequency FB(=fm+SFA) output from inverter 6.

Rectifier 5 is controlled by phase controller 15 based on signal VB. Signal VB is generated by voltage controller (F/V converter) 13, and represents a voltage-/frequency ratio corresponding to signal N detected by generator 4. In this manner, motor 2A is torque-controlled through rectifier 5 and inverter 6, and input power PM of motor 2A is controlled to correspond to preset power reference Pref. Then, since output P of motor 2A is proportional to input PM thereto, motor output P can be controlled by power reference Pref.

Generally, torque T and output P of an induction motor can be approximated by the following equations:

$$T = K1fs\{Vm/(fm+fs)\}^2 \quad (1)$$

$$P = 2\pi fmT \quad (2)$$

where K1 is a constant, Vm is a motor terminal voltage, fm is a rotational frequency, and fs is a slip frequency.

Usually, since slip frequency fs of an induction motor is sufficiently smaller than rotational frequency fm, equation (1) can be simplified as:

$$T = K1fs(Vm/fm)^2 \quad (3)$$

From equations (2) and (3), $$P = 2\pi K1 fs fm (Vm/fm)^2 \quad (4)$$

When ratio Vm/fm of voltage Vm to frequency fm is controlled to be constant, equation (4) becomes $$P = K2 fs fm \quad (5)$$

$$K2 = 2\pi K1 (Vm/fm)^2$$

Namely, P can be controlled by frequency fs. Also, when $$fs = Pref/K2fm \quad (6)$$

(Pref: power reference) is given as an instruction value (SFA) of slip frequency fs, and the induction motor is driven at frequency $fs+fm(=fb)$, then $$P = K2(Pref/K2fm)fm = Pref \quad (7)$$

Thus, output P of the induction motor can be continuously controlled in accordance with reference Pref.

Incidentally, torque correction signal TAB, described before, is a signal for correcting an error occurring as a result of approximations by equations (1) to (3).

Slip frequency instruction fs (SFA) is added to rotational frequency fm (N) of the induction motor by adder A2, and inverter 6 is operated at frequency $fm+fs(=FB)$ by pulse generator 14 for inverter control. Motor 2A can thus be driven at frequency fs corresponding to power reference Pref.

Induction motor rotational frequency fm is converted into an induction motor terminal voltage reference (Vmr) by a frequency/voltage converter in voltage controller 13. Rectifier 5 is automatically controlled by phase controller 15 in accordance with signal VB corresponding to reference Vmr, so that the inverter output voltage (=induction motor terminal voltage Vm) is equal to the reference value (Vmr). Then, ratio Vm/fm of terminal voltage Vm to rotational frequency fm is controlled to be constant by the automatic control system. (Incidentally, such a control circuit for setting ratio Vm/fm constant can be constituted by circuit elements 13A to 13C, 15, A3, A4, 71, and 81, shown in FIG. 5, to be described later.)

With the above arrangement, the output torque of motor 2A is changed by changing slip frequency fs of motor 2A, which corresponds to reference SFA, in accordance with reference Pref. In other words, the load, to be shared by motor 2A for turbine 1, can be controlled by power reference Pref. In this case, voltage Vm, applied to motor 2A, is controlled so as to correspond to a predetermined value (VB) representing motor rotational frequency N. (In FIG. 1, the field magnetic flux (corresponding to voltage Vm) is not controlled by load sharing control.)

FIGS. 6A to 6F are timing charts explaining a procedure for causing motor 2A to generate a load when induction motor 2A is not excited (input PM=0) while its rotor is rotated by an output from turbine 1. Upon reception of a start instruction (time t10 in FIG. 6A), power converter 100, shown in FIG. 5, receives reference Pref (FIG. 6B) for operating the converter (rectifier 5 and inverter 6) at the same frequency as rotational frequency N (FIG. 6C), and output voltage Vm (FIG. 6D) of the converter (5 and 6) is set to exceed a predetermined level or at a rated value. Thereafter, slip frequency fs is slowly increased (after time t20 of FIG. 6E) to increase the the output (FIG. 6F) of motor 2A, and motor 2A partially shares the driving power of the load. When motor 2A is to be disconnected from mechanical load 3, slip frequency fs is set to 0 in an opposite manner, and then power supply is stopped (to set Vm=0).

Figure 2:
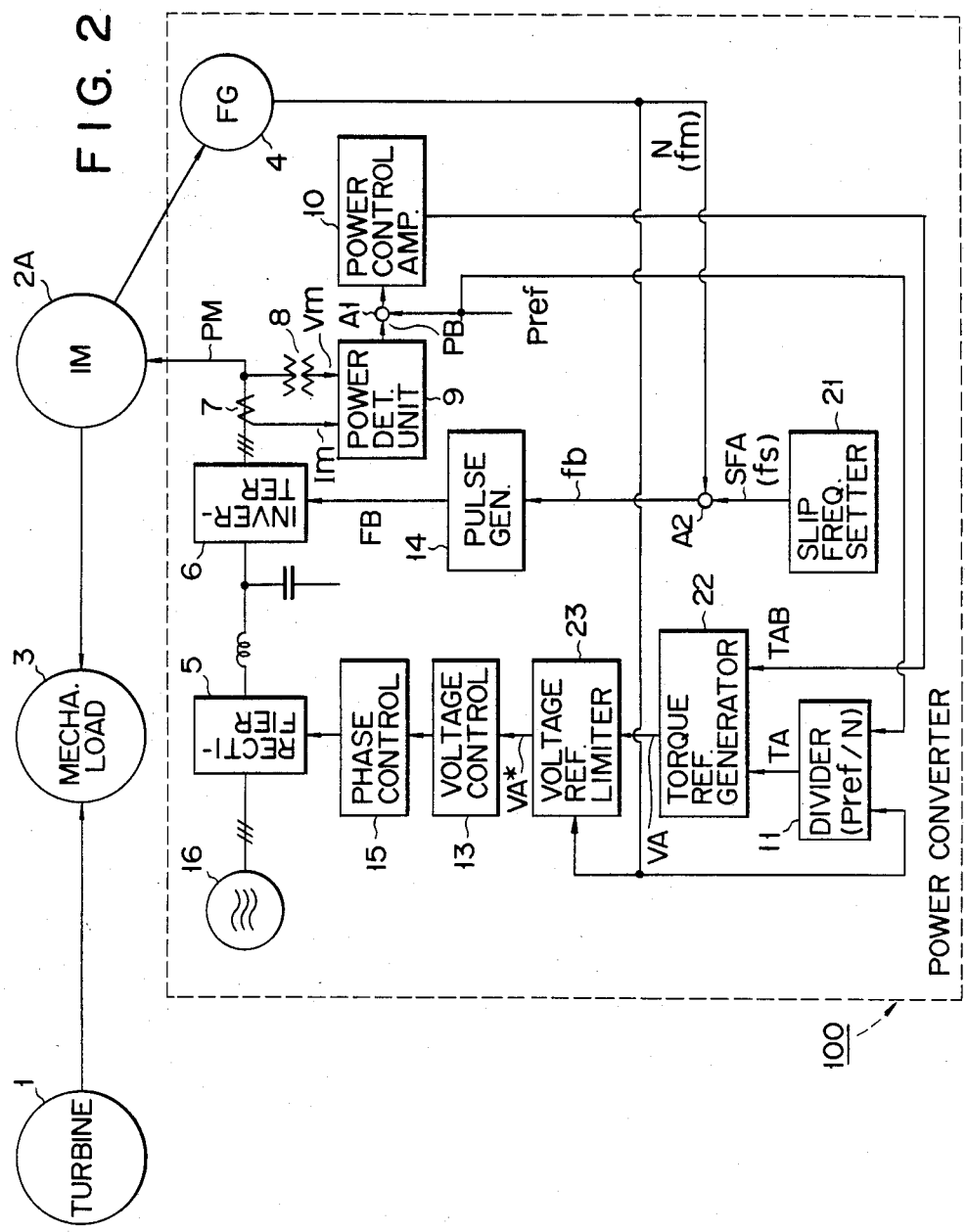
FIG. 2 is a block diagram of a turbine helper drive apparatus according to another embodiment of the present invention, in which an induction motor (2A) has a constant slip frequency (fs) and its field magnetic flux is controlled by a supply voltage (Vm)

FIG. 2 shows a second embodiment of the present invention.

In FIG. 2, induction motor 2A is used as an AC motor, a voltage reference is adopted as a torque reference, and constant slip frequency control is employed.

Referring to FIG. 2, power converter 100 has rectifier 5, inverter 6, slip frequency setter 21, torque reference generator 22, voltage reference limiter 23, voltage controller 13, pulse generator 14, phase controller 15, frequency generator 4, divider 11, current transformer 7, potential transformer 8, power detector unit 9, and power control amplifier 10.

Input power PM of motor 2A is controlled in the following manner. More specifically, output frequency FB of inverter 6 is obtained by pulse generator 14 in the form of gate pulses in accordance with frequency fb (=fm+SFA). Frequency fb is obtained by adding, in adder A2, slip frequency reference SFA (=fs) preset by frequency setter 21 and frequency fm corresponding to frequency signal N detected by frequency generator 4.

Inverter 6 is controlled by the gate pulses of frequency $FB(=fm+SFA)$.

Rectifier 5 is controlled in the following manner. First, power reference Pref is divided by divider 11 by frequency signal N and is converted into torque instruction signal TA which corresponds to power Pref normalized by signal N. Torque reference generator 22 generates voltage signal $VA(=TA+TAB)$ based on torque instruction TA and torque correction signal TAB obtained from amplifier 10.

Output signal VA is input to voltage reference limiter 23 as a voltage reference. Limiter 23 limits the output frequency of inverter 6 so that its output voltage per unit frequency (V/F ratio) does not become excessively large. Voltage reference signal VA*, obtained from limiter 23, limits the voltage of rectifier 5, via voltage and phase controllers 13 and 15.

Induction motor 2A supplies a torque to mechanical load 3 by means of rectifier 5 and inverter 6 controlled in the above manner, and power P of motor 2A is thus controlled to be reference power Pref.

In FIG. 1, the output torque of motor 2A is changed by changing its slip frequency reference SFA. In FIG. 2, reference SFA is fixed, and the output torque of motor 2A is changed by changing voltage reference VA (i.e., changing the field magnetic flux of the motor) in accordance with power reference Pref. In other words, in FIG. 2, the load sharing of motor 2A for turbine 1 is controlled by reference Pref in a method different from that in FIG. 1.

Figure 3:
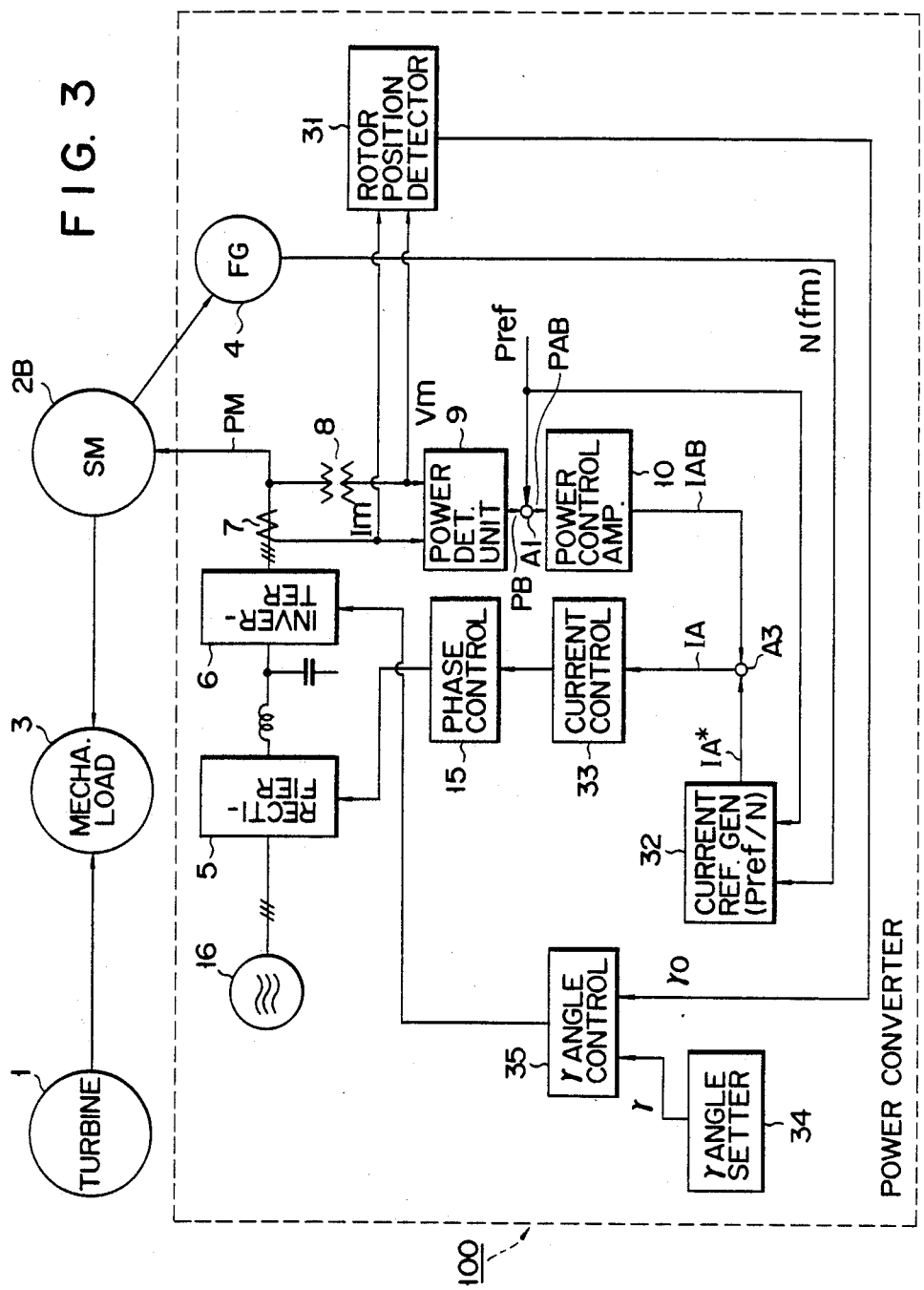
FIG. 3 is a block diagram of a turbine helper drive apparatus according to still another embodiment of the present invention, in which a synchronous motor (2B) has a constant field magnetic flux and constant power factor and its output torque is controlled by a supply current (Im)

FIG. 3 shows a third embodiment of the present invention.

In FIG. 3, synchronous motor 2B is used as an AC motor for helper-driving mechanical load 3. Auxiliary driving of turbine 1 is performed by motor 2B. Constant commutation leading angle control (i.e., constant $\gamma$ angle control) is employed as a method to control the output torque. Current reference (IA) is employed as a torque reference.

Power converter 100 of FIG. 3 has rectifier 5, inverter 6, current reference generator 32, power control amplifier 10, current controller 33, phase controller 15, current transformer 7, potential transformer 8, power detector unit 9, rotor position detector 31, $\gamma$ angle controller 35, frequency generator 4, and $\gamma$ angle setter 34.

An output from AC power source 16 is converted into a variable AC voltage (Vm) with a variable frequency through rectifier 5 and inverter 6, and the converted voltage (Vm) is supplied to motor 2B. Motor 2B is connected to turbine 1 via the same axle, and supplies power to mechanical load 3.

The rotational frequency of motor 2B and turbine 1 is kept at a constant value by a governor (not shown) of turbine 1. Load sharing is determined by controlling the power of motor 2B, in the same manner as in the first and second embodiments.

Input power PM of motor 2B is controlled in the following manner. More specifically, signals Im and Vm from current and potential transformers 7 and 8 are input to detector unit 9. Detector unit 9 generates power feedback signal PB corresponding to the active component of motor input power PM. Power reference Pref is subjected to subtraction with signal PB in adder A1 to obtain difference PAB. Calculated difference PAB is input to power control amplifier 10, and is converted into current reference correction signal IAB.

Power reference Pref is divided, in reference generator 32, by frequency signal N of motor 2B obtained from frequency generator 4. The divided value (Pref/N) is converted into current reference IA* which corresponds to reference Pref normalized by frequency signal N. Reference IA* and correction signal IAB are added by adder A3 to provide actual current reference IA. Obtained current reference IA is supplied to rectifier 5 through controllers 33 and 15. Rectifier 5 controls motor 2B in accordance with reference IA.

Rotor position detector 31 electrically detects the position of the magnetic flux of motor 2B, by using signals Im and Vm from transformers 7 and 8, respectively, In other words, detector 31 outputs a commutation leading angle ($\gamma 0$), corresponding to the phase difference (power factor) of signals Vm and Im, as a signal representing the rotation magnetic flux position of motor 2B.

A $\gamma$ angle is controlled by $\gamma$ angle controller 35 in order to obtain a constant $\gamma$ angle which is set by $\gamma$ angle setter 34 with respect to the detected magnetic flux position, and an output current (Im) of inverter 6 is controlled by the constant $\gamma$ angle.

Therefore, motor 2B is torque-controlled by rectifier 5 and inverter 6, and input power PM of motor 2B is also controlled at a value to correspond to power reference Pref.

In the embodiment (thyristor motor) of FIG. 3, the field magnetic flux of motor 2B is changed while maintaining commutation leading angle $\gamma$ of motor 2B constant, and current reference IA is changed in accordance with power reference Pref. The output torque control of motor 2B (i.e., load sharing control for turbine 1) based on reference Pref is performed in this manner.

As prior U.S. applications relating to a thyristor motor, although not directly concerned with the present invention, the following applications are listed.

(1) Hirata, U.S. patent application Ser. No. 729,176, filed on May 1, 1986.

(2) Hirata, U.S. patent application Ser. No. 914,273, filed on Oct. 2, 1986.

Figure 4:
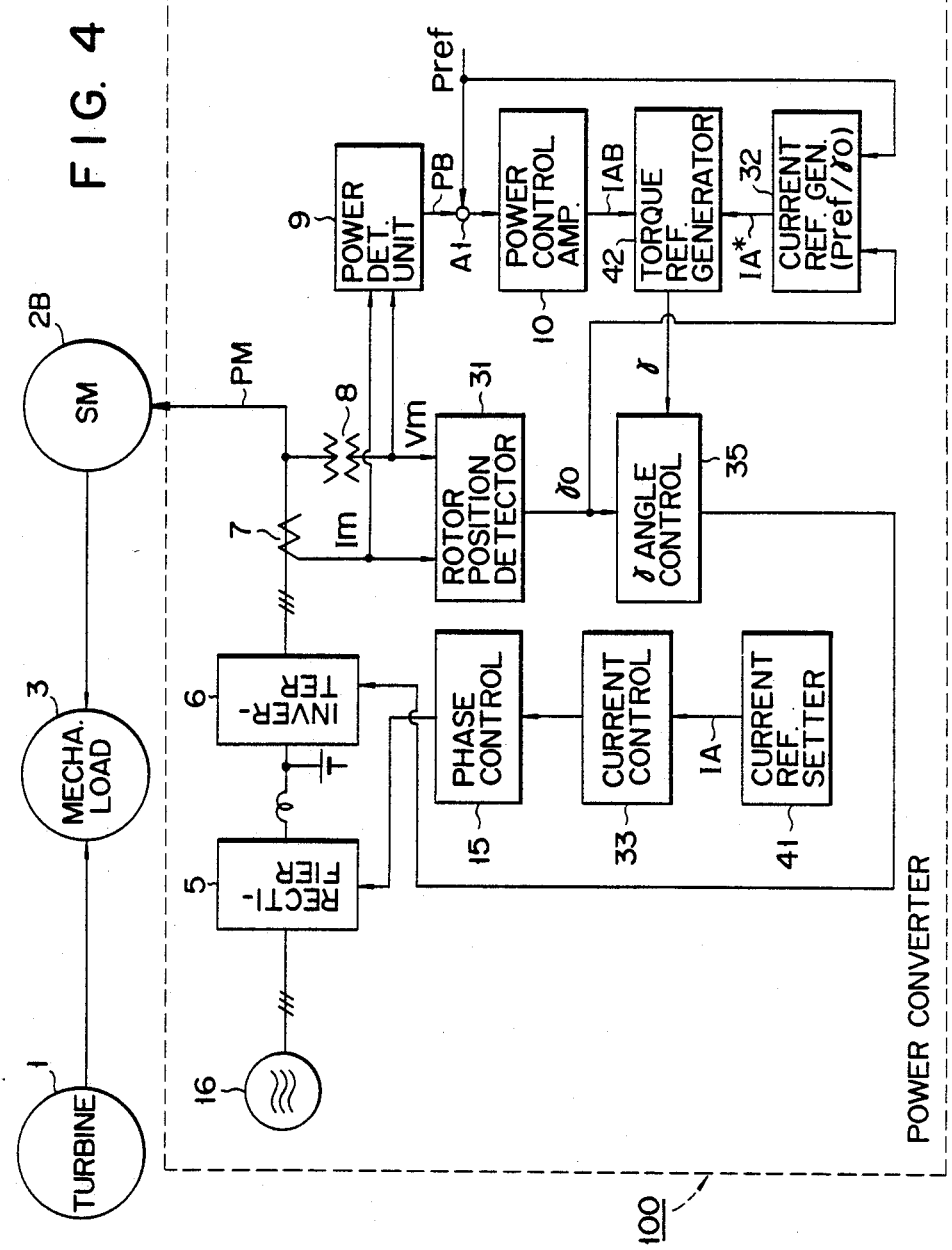
FIG. 4 is a block diagram of a turbine helper drive apparatus according to still another embodiment of the present invention, in which a constant current (Im) is supplied to a synchronous motor (2B) and its power factor is controlled by a commutation leading angle ($\gamma$)

FIG. 4 shows a fourth embodiment of the present invention.

In the fourth embodiment, synchronous motor 2B is used as a turbine helper AC motor, as in the third embodiment. A $\gamma$ angle reference is employed as a torque reference, and constant current control is performed.

Power converter 100 of FIG. 4 has rectifier 5, inverter 6, torque reference generator 42, $\gamma$ angle controller 35, current transformer 7, potential transformer 8, rotor position detector 31, current reference setter 41, current controller 33, and phase controller 15.

The power of motor 2B is controlled in the following manner. Rotor position detector 31 detects a magnetic flux position of motor 2B based on signals Im and Vm from transformers 7 and 8, respectively. Detected magnetic flux position $\gamma 0$ is input to $\gamma$ angle controller 35.

Torque reference generator 42 has the same configuration as a circuit (A3) of the embodiment shown in FIG. 3, which adds the output from power control amplifier 10 to that from current reference generator 32 ($\gamma=IA*+IAB$), and supplies the $\gamma$ angle reference to controller 35 as a torque reference. Controller 35 controls inverter 6 based on input signals $\gamma 0$ and $\gamma$ in order to obtain $\gamma=\gamma 0$.

Current reference IA, set by setter 41, is supplied to rectifier 5 through controllers 33 and 15. This reference IA controls rectifier 5, and input power PM of motor 2B is controlled to correspond to preset reference power Pref.

In the embodiment of FIG. 4, commutation leading angle γ (power factor) is changed in accordance with power reference Pref while maintaining the current (Im) to be supplied to motor 2B at a constant value to correspond to current reference IA. Thus, the output torque control of motor 2B is performed in accordance with reference Pref.

As a modification of the embodiment of FIG. 4, although not shown, control can be performed such that the γ angle is maintained constant while the voltage (Vm) to be supplied to motor 2B is changed (i.e., the field magnetic flux of motor 2B is changed) in accordance with reference Pref.

As described above, according to the embodiment of FIG. 1, 2, 3, or 4, a helper drive apparatus (2+100) for generating a torque that cannot be compensated for only by a conventional turbine drive apparatus is provided. (Thus, the present invention can be embodied by using a conventional turbine drive apparatus.) The helper drive apparatus serves as a means effective for dealing with a temporary increase in load 3. In this case, since input power PM of helper AC motor 2 is controlled in accordance with preset value Pref, the load of the helper drive apparatus can be adjusted as required. Further, since power and torque control loops are both employed, high-precision power control can be performed without impairing a quick-response property.

As a secondary effect, since load sharing between the turbine and helper drive apparatus is adjustable, it can be determined considering fuel costs, thereby decreasing running costs. For example, during nighttime operation, a large output can be generated by the helper drive apparatus by using nighttime electric power that is available at cheaper rates so that the turbine can serve as an auxiliary drive.

Figure 5:
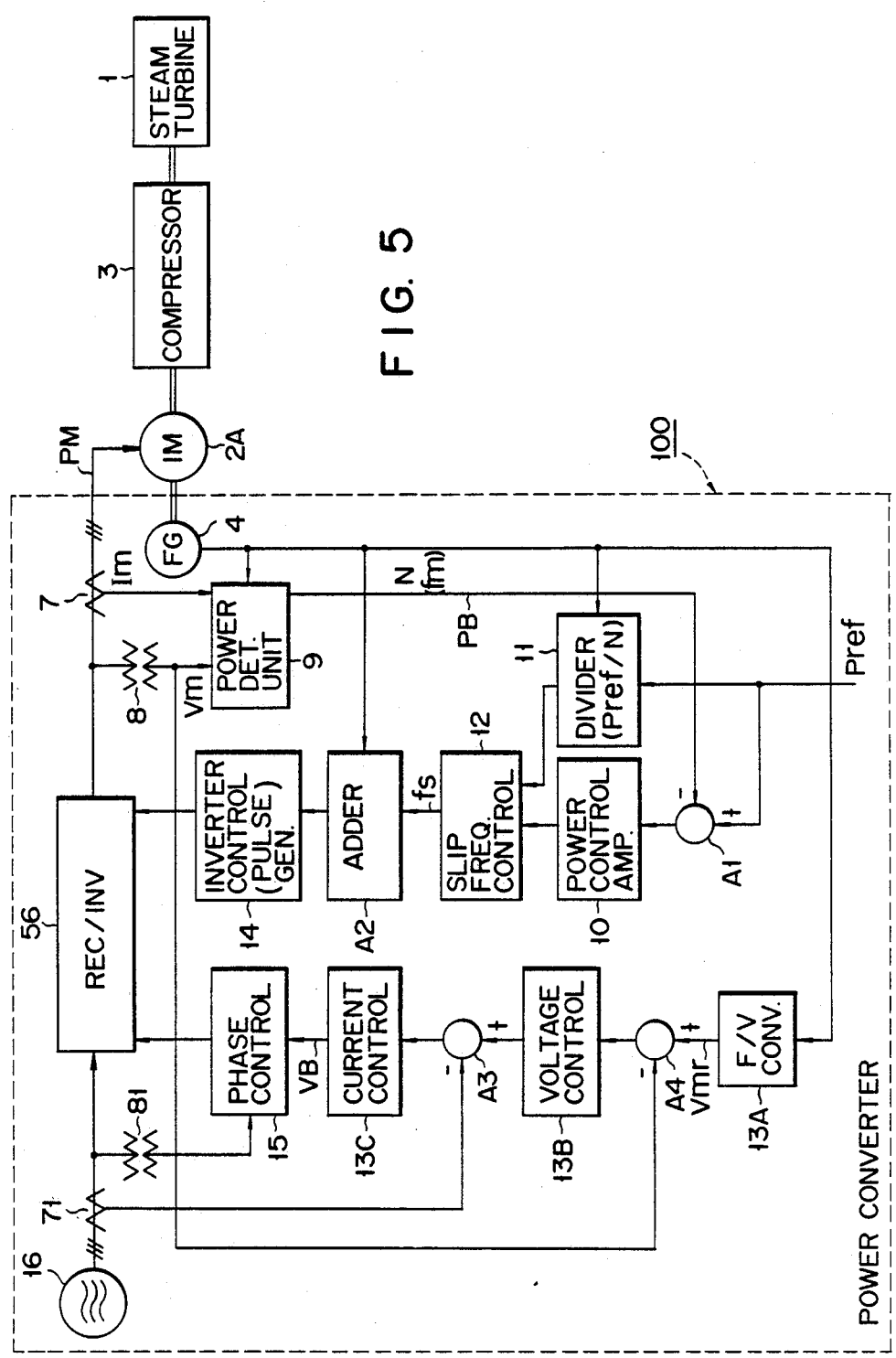
FIG. 5 shows a modification of FIG. 1, in which the output (PB) of a power detector unit (9) can be corrected in accordance with the rotational frequency (N) of an induction motor (2A)

FIG. 5 shows a modification of FIG. 1. Converter (rectifier/inverter) 56 of FIG. 5 corresponds to rectifier 5+inverter 6 of FIG. 1. Circuit elements 13A and 13C, A3, A4, and 71 of FIG. 5 correspond to voltage controller 13 of FIG. 1. More specifically, in FIG. 5, rotational frequency fm of motor 2A is converted into voltage reference Vmr via F/V converter 13A, and signal VB is changed so that terminal voltage Vm of motor 2A follows reference Vmr, to thereby cause the ratio Vm/fm in equation (4) to become constant.

One of the characteristic features of FIG. 5, that cannot be obtained by the embodiment of FIG. 1, is that power detector unit 9 can perform correction (fm·k) in accordance with the rotational frequency of motor 2A, in addition to the calculation of active input power $\sqrt{3}$Vm·Im·cos φm (where cos φm is the power factor of motor 2A) of motor 2A. More specifically, unit 9 of FIG. 5 detects $PB = \sqrt{3}Vm \cdot Im \cdot \cos \phi m + fm \cdot k$ (assuming that k=0 in FIG. 1). The value of k is determined case by case. For instance, when a non-linear relationship exists between the input power (PM) of motor 2A and its rotational frequency (N), the value of k ($\neq 0$) can be determined as required.

Figure 7:
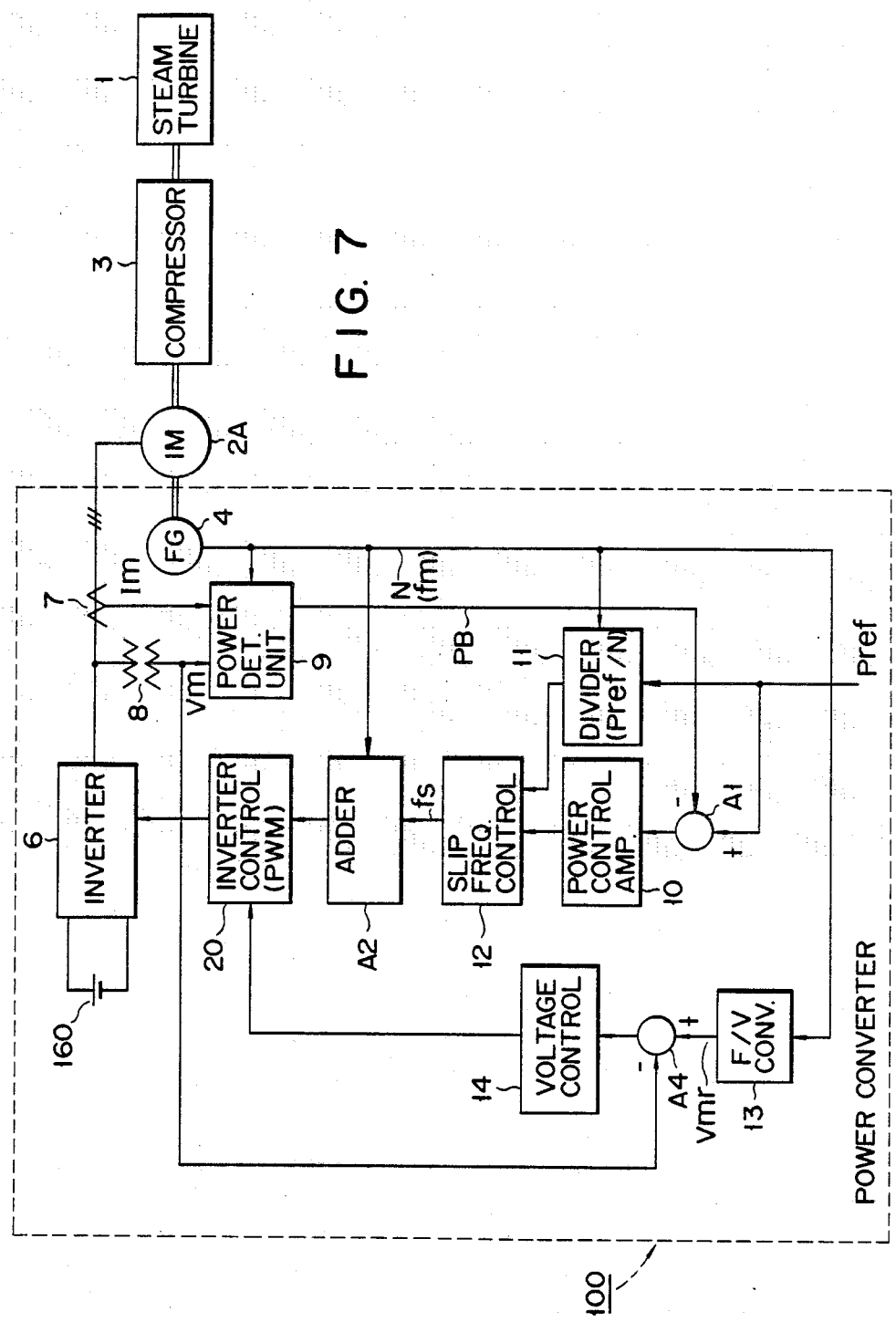
FIG. 7 shows a modification of FIG. 5, in which an inverter is powered by a DC power source (160)

FIG. 7 shows a modification of FIG. 5. In FIG. 7, converter 56 of FIG. 5 is replaced by PWM inverter 6, and inverter 6 is powered by fuel cell (or solar cell) 160. Referring to FIG. 7, PWM inverter 6 is controlled by PWM inverter controller 20.

Converter 56 of FIG. 5 and inverter 6 of FIG. 7 can be self-commutated type or load-commutated type inverters. Since the configuration of the self-commutated type and load-commutated type inverters is well known, a description thereof is omitted.

When the loss in induction motor 2A is negligible or the control precision of motor 2A is not critical, power detector unit 9 need only calculate input power PM of motor 2A.

According to the embodiment of FIG. 5 or 7, the output of motor 2A can be continuously controlled, from zero to a predetermined rated value, by slip frequency fs. This enables the load sharing control for turbine 1 and motor 2A, to thereby decrease power costs. In these embodiments, since output control is performed by means of slip frequency fs, no large stress is applied to the shafts of motor 2A, turbine 1, and compressor 3. Furthermore, since compressor 3 can be driven by either motor 2A or turbine 1, the reliability of the entire system is increased (i.e., even when a trouble occurs in either motor 2A or turbine 1, compressor 3 can be driven by a normal one of them). Then, a reliable energy-conservated system can be obtained.

Figure 8:
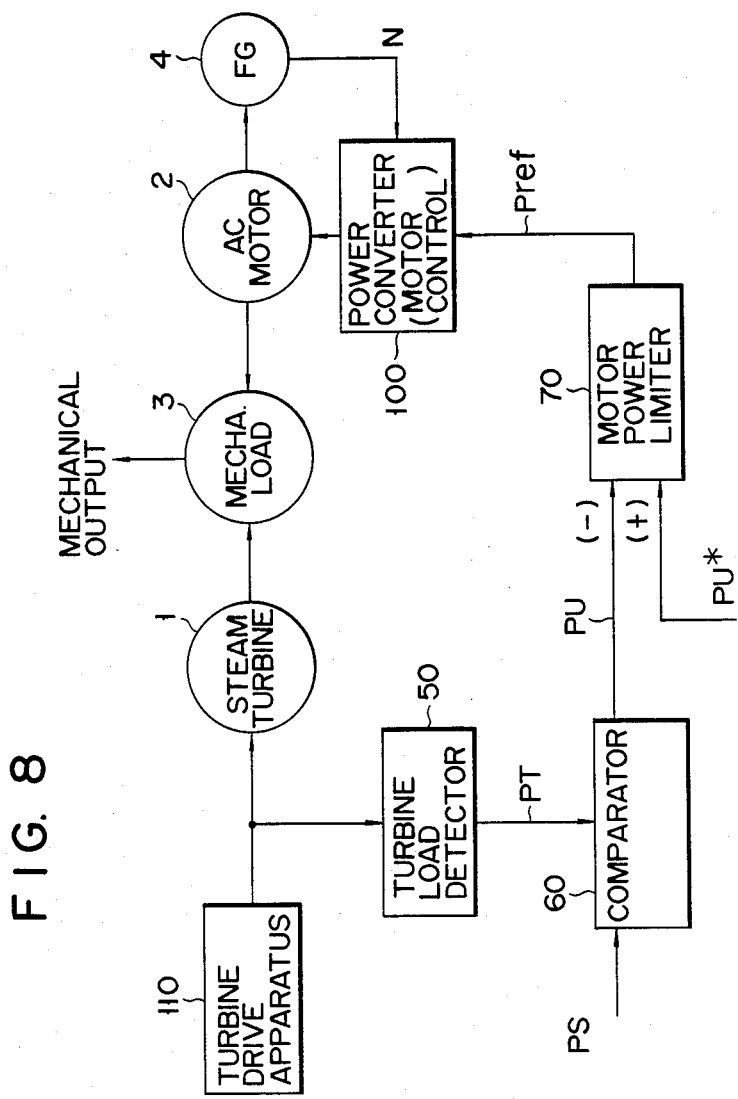
FIG. 8 shows a modification of the apparatus shown in FIGS. 1 to 5 and 7, in which the output of a motor (2) is controlled in accordance with the load of a turbine (1)

FIG. 8 shows an application of an embodiment of either one of FIGS. 1 to 5 or 7, as an automatic control system which can automatically change power reference Pref to be supplied to power converter 100, in accordance with the load of turbine 1.

Referring to FIG. 8, steam turbine 1 and AC motor (induction or synchronous motor) 2 are coupled to mechanical load (e.g., a compressor) 3 via the same axle. Motor 2 partially drives load 3 as a helper motor of turbine 1.

Turbine 1 is driven by turbine drive apparatus 110. The part of turbine load PT is detected, by turbine load detector 50 utilizing the same principle as a Pitot tube, from a steam flow rate (pressure) or the like. AC motor 2 is driven by power converter (motor controller) 100, and rotational frequency N of its drive shaft is detected by frequency generator 4. (In FIG. 8, generator 4 is shown outside converter 100.)

Detected turbine load PT is supplied to comparator 60. Comparator 60 receives load reference PS corresponding to an allowable minimum load of turbine 1, and compares turbine load PT with reference PS. When PT<PS is obtained, comparator 60 supplies power limit signal PU corresponding to the difference (PS−PT) therebetween to motor power limiter 70.

Motor power limiter 70 receives, in addition to signal PU from comparator 60, preset power reference PU*. Then, limiter 70 performs arithmetic operation of PU*−PU, and supplies new power reference Pref(=PU*−PU) to power converter 100. As a result, input power PM of motor 2 is controlled in accordance with power reference Pref.

More specifically, when the output of turbine drive apparatus 110 is decreased and load PT becomes small (PT<PS), comparator 60 outputs signal PU(=PS−PT) which is increased to compensate for this decrease in load PT. Then, limiter 70 supplies to power converter 100 power reference Pref(=PU*−PU) which is decreased to compensate for the increase in signal PU. As a result, the load, shared by motor 2, is decreased, and the load, assigned to turbine 1, is increased by an amount corresponding to the decrease in the load of motor 2 so that the turbine load exceeds an allowable minimum load, to thereby perform stable operation.

When motor 2 of FIG. 8 is an induction motor (2A), converter 100 of FIG. 1, 2, 5, or 7 can be used as power converter 100; when motor 2 is a synchronous motor (2B), converter 100 of FIG. 3 or 4 can be used.

Figure 9:
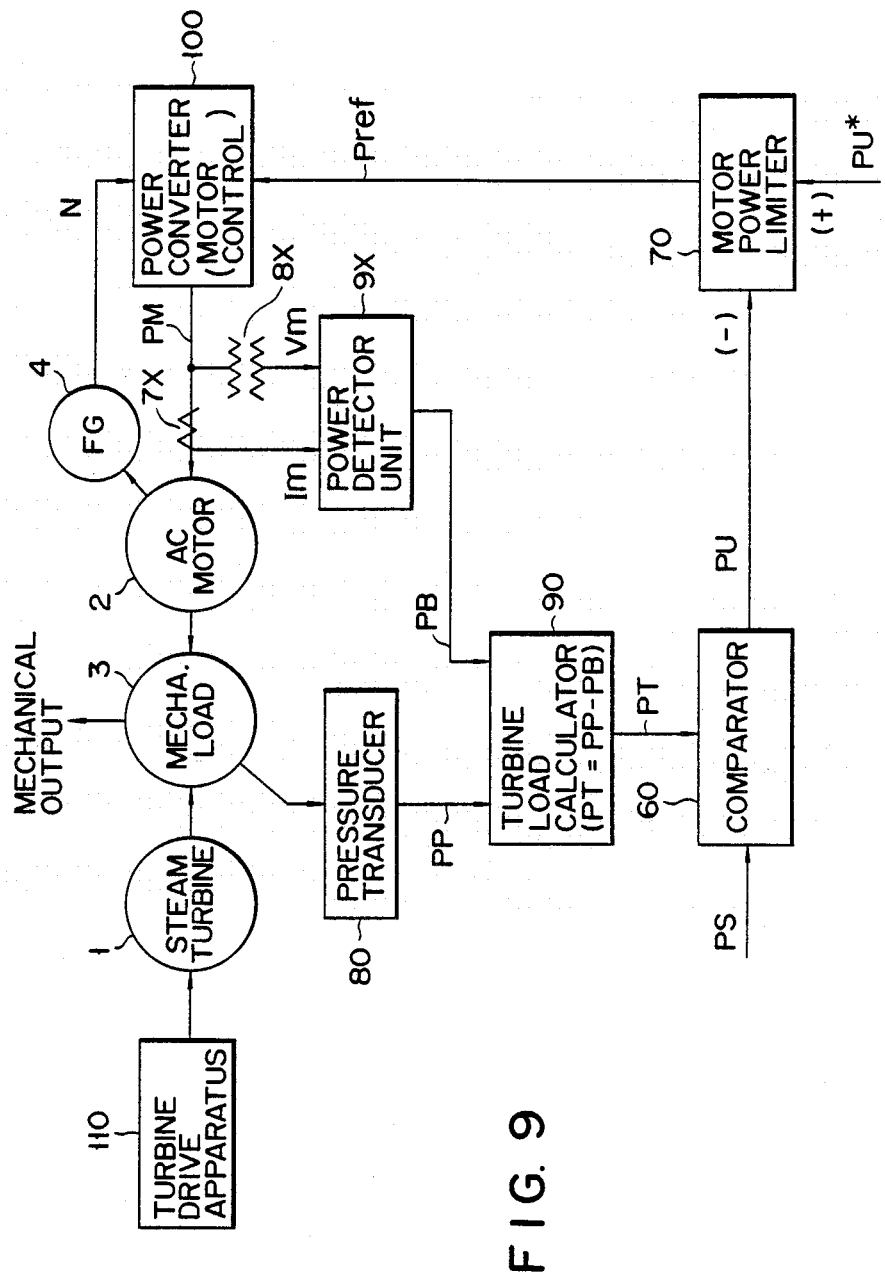
FIG. 9 shows a modification of FIG. 8, in which the output of a motor (2) is controlled in accordance with a difference between a total required load (PP) of a steam turbine (1) and an input power (PB) of the motor (2)

FIG. 9 shows a modification of FIG. 8.

Referring to FIG. 9, the load of steam turbine 1 is detected as a difference between the total required load of mechanical load 3 and the load of AC motor 2. Except for this, the apparatus of FIG. 9 is the same as that of FIG. 8.

More specifically, power signal PP corresponding to the total required load of mechanical load 3 is detected, from the steam pressure of steam turbine 1, through pressure transducer 80. The load (PM) of AC motor 2 is detected, as power feedback signal PB, from output signals Im and Vm from current and potential transformers 7X and 8X, respectively, through power detector unit 9X. Signals PP and PB are input to turbine load calculator 90, and turbine sharing load PT is calculated in accordance with a predetermined arithmetic operation ($PT = PP - PB$).

Thereafter, in accordance with the same circuit operation as in the case of FIG. 8, control is performed so that the sharing load of turbine 1 does not become smaller than an allowable minimum load.

Figure 10:
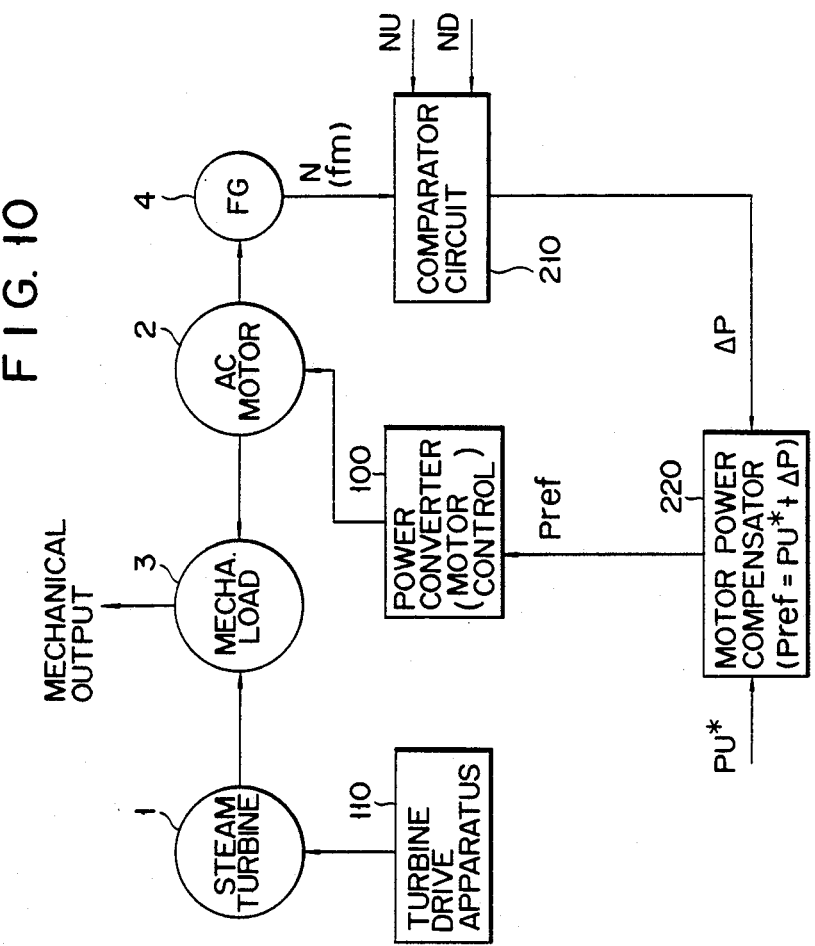
FIG. 10 shows another modification of FIG. 8, in which the output of a motor (2) is controlled in accordance with its rotational frequency (N)

FIG. 10 shows another modification of FIG. 8.

Referring to FIG. 10, the configuration of steam turbine 1, AC motor 2, mechanical load 3, frequency generator 4, turbine drive apparatus 110, and power converter 100 is the same as the case of FIGS. 1 and 9.

Comparator circuit 210 receives rotational frequency signal N, compares it with preset upper and lower limit frequencies NU and ND, performs the following arithmetic operations, and outputs motor power correction signal $\Delta P$.

$$\begin{array}{ll} \Delta P = 0 & (\text{if } ND \leq N \leq NU) \\ \Delta P \text{ (negative)} = k1 \cdot (NU - N) & (\text{if } NU < N) \\ \Delta P \text{ (positive)} = k2 \cdot (ND - N) & (\text{if } N < ND) \end{array} \quad (8)$$

Motor power correction signal $\Delta P$ is supplied to motor power compensator 220 and is added to preset power reference PU*, so that new power reference $Pref = PU^* + \Delta P$ is provided. Power control of motor 2 is performed with this new reference Pref.

Therefore, when frequency N of the drive system exceeds upper limit frequency NU, power reference Pref is decreased. When frequency N is lower than lower limit frequency ND, power reference Pref is increased. As a result, frequency N of the drive system is held between lower and upper limit frequencies ND and NU.

FIG. 11 shows a practical example of comparator circuit 210 which performs arithmetic operation of equation (8). More specifically, rotational frequency signal N is input to comparators 210A and 210B. Comparator 210A receives upper limit frequency NU as a comparison level. When NU<N, comparator 210A outputs signal −OUT corresponding to NU−N. (When NU≧N, −OUT is 0.) −OUT is multiplied by k1 by coefficient circuit 210C and supplied to adder 210E. Comparator 210B receives lower limit frequency ND as a comparison level. When N<ND, comparator 210B outputs signal +OUT corresponding to ND−N. (When N≧ND, +OUT is 0.) +OUT is multiplied by k2 by coefficient circuit 210D and supplied to adder 210E. Adder 210E outputs correction signal $\Delta P$ satisfying the three conditions of equation (8).

When coefficients k1 and k2 in the above arithmetic operation are set to be k1>k2, corrections of small and large magnitudes are performed when the power reference is increased and decreased, respectively. As a result, when the frequency is excessively high, it can be decreased quickly. Also, it is effective in preventing occurrence of vibration in the mechanical system caused by the correction.

As described above, according to the embodiment of FIGS. 8, 9, or 10, in a turbine helper drive apparatus wherein AC motor 2 is coupled to turbine 1 and power control is performed through power converter 100, a load generated by a turbine system is controlled so as not to be smaller than its allowable minimum load. As a result, instability caused by surge of the turbine system or the like can be prevented.

Since the frequency of the drive system is held within a range of upper and lower frequencies required for stable drive, the stability of the helper motor system can be improved.

In all the embodiments described above, power detector unit 9 (or 9X) can detect not only active components (in-phase components of Vm and Im) but also reactive components (90° phase-shifted components of Vm and Im) in the power (PM) supplied to the motor (2).

What is claimed is:

1. A turbine helper drive apparatus comprising:
   a turbine;
   a load device mechanically coupled to said turbine and driven thereby;
   an alternating-current motor, mechanically coupled to said load device, for driving said load device in cooperation with said turbine, to thereby partially share a load of said load device; and
   control means for controlling said alternating-current motor in accordance with a power reference that determines a load sharing ratio of said turbine and said alternating-current motor, so that a mechanical output from said alternating-current motor corresponds to the power reference.

2. An apparatus according to claim 1, wherein said alternating-current motor is an induction motor, and said control means includes:
   voltage control means for setting a voltage applied to said induction motor to a predetermined value corresponding to a rotational frequency thereof; and
   current control means for changing a current supplied to said induction motor in accordance with the power reference.

3. An apparatus according to claim 2, wherein said current control means includes:
   power detecting means for detecting input power supplied to said induction motor and generating a power signal representing the input power;
   torque correction means for detecting a difference between the power signal and the power reference and generating a torque correction signal corresponding to the difference;
   torque instruction means for detecting the rotational frequency of said induction motor and generating a torque instruction signal representing a ratio of data of the rotational frequency to the power reference;
   frequency reference generating means for adding the torque correction signal to the torque instruction signal, so that a slip frequency reference is generated; and
   means for changing a current to be supplied to said induction motor based on a frequency signal obtained by adding the slip frequency reference to the rotational frequency data, thereby controlling an output torque of said induction motor in accordance with the power reference.

4. An apparatus according to claim 1, wherein said alternating-current motor is an induction motor, and said control means includes:
   current control means for setting a current supplied to said induction motor at a predetermined value corresponding to a rotational frequency thereof; and
   voltage control means for changing a voltage applied to said induction motor in accordance with the power reference.

5. An apparatus according to claim 4, wherein said voltage control means includes:
   power detecting means for detecting input power supplied to said induction motor and generating a power signal representing the input power;
   torque correction means for detecting a difference between the power signal and the power reference and generating a torque correction signal corresponding to the difference;
   torque instruction means for detecting the rotational frequency of said induction motor and generating a torque instruction signal representing a ratio of data of the rotational frequency to the power reference;
   voltage reference generating means for adding the torque correction signal to the torque instruction signal, so that a voltage reference is generated; and
   means for changing a voltage to be applied to said induction motor based on the voltage reference, thereby controlling an output torque of said induction motor in accordance with the power reference.

6. An apparatus according to claim 1, wherein said alternating-current motor is a synchronous motor, and said control means includes:
   commutation leading angle control means for detecting a commutation leading angle of said synchronous motor and setting the commutation leading angle at a predetermined value; and
   current control means for changing a current supplied to said synchronous motor in accordance with the power reference.

7. An apparatus according to claim 6, wherein the current control means includes:
   power detecting means for detecting input power supplied to said synchronous motor and generating a power signal representing the input power;
   current correction means for detecting a difference between the power signal and the power reference and generating a current correction signal corresponding to the difference;
   current instruction means for detecting a rotational frequency of said synchronous motor and generating a current instruction signal representing a ratio of data of the rotational frequency to the power reference;
   current reference generating means for adding the current correction signal to the current instruction signal, so that a current reference is generated; and
   means for changing a current to be supplied to said synchronous motor based on the current reference, thereby controlling an output torque of said synchronous motor in accordance with the power reference.

8. An apparatus according to claim 1, wherein said alternating-current motor is a synchronous motor, and said control means includes:
   current control means for setting a current to be supplied to said synchronous motor at a predetermined value; and
   commutation leading angle control means for changing a commutation leading angle of said synchronous motor in accordance with the power reference.

9. An apparatus according to claim 8, wherein said commutation leading angle control means includes:
   power detecting means for detecting input power supplied to said synchronous motor and generating a power signal representing the input power;
   current correction means for detecting a difference between the power signal and the power reference and generating a current correction signal corresponding to the difference;
   current instruction means for detecting the commutation leading angle of said synchronous motor and generating a current instruction signal representing a ratio of the commutation leading angle to the power reference;
   commutation leading angle reference generating means for adding the current correction signal to the current instruction signal, so that a commutation leading angle reference is generated; and
   means for changing a power factor angle of the input power to be supplied to said synchronous motor so that the commutation leading angle matches the commutation leading angle reference, thereby controlling an output torque of said synchronous motor in accordance with the power reference.

10. An apparatus according to claim 1, further comprising:
    turbine load detecting means for detecting the load of said turbine and generating a turbine load signal representing the detected load; and
    means, responsive to a predetermined load reference and a difference between the turbine load and the load reference, for changing the power reference such that the difference is decreased when the difference appears.

11. An apparatus according to claim 1, further comprising:
    load detecting means for generating a load signal representing a total required load of said load device;
    power detecting means for detecting the input power to be supplied to said alternating-current motor, and generating a power signal representing the input power;
    difference detecting means for detecting a difference between the load signal and the power signal and generating a difference signal representing the detected difference; and
    means, responsive to a predetermined load reference and a difference between the difference signal and the load reference, for changing the power reference such that the difference is decreased with the difference appears.

12. An apparatus according to claim 1, further comprising:
    means for detecting the rotational frequency of said alternating-current motor and generating a rotational frequency signal;

means, responsive to a predetermined rotational frequency upper limit value and a predetermined rotational frequency lower limit value, for outputting a first power correction signal when the rotational frequency signal falls between the rotational frequency uppr and lower limit values, outputting a second power correction signal obtained by multiplying by a predetermined first coefficient a remainder obtained by subtracting the rotational frequency signal from the upper limit value when the rotational frequency signal exceeds the rotational frequency upper limit value, and outputting a third power correction signal obtained by multiplying by a predetermined second coefficient a remainder obtained by subtracting the rotational frequency signal from the lower limit value when the rotational frequency signal is less than the rotational frequency lower limit value; and means for adding a predetermined preset power value and the first to third power correction signals, thereby generating the power reference.

13. An apparatus according to claim 12, wherein the first coefficient is larger than the second coefficient.

14. An apparatus according to claim 3, wherein said power detecting means outputs the power signal which is changed in accordance with the rotational frequency of said induction motor.

15. An apparatus according to claim 5, wherein said power detecting means outputs the power signal which is changed in accordance with the rotational frequency of said induction motor.

* * * * *